UNITED STATES PATENT OFFICE.

RUPERT GREVILLE-WILLIAMS, OF ALBANY, NEW YORK, ASSIGNOR TO THE ALBANY COAL TAR, DYE AND CHEMICAL COMPANY, OF SAME PLACE.

PROCESS OF MAKING ORCINE DYE.

SPECIFICATION forming part of Letters Patent No. 410,057, dated August 27, 1889.

Application filed March 5, 1889. Serial No. 301,919. (No specimens.)

*To all whom it may concern:*

Be it known that I, RUPERT GREVILLE-WILLIAMS, a subject of Her Majesty the Queen of Great Britain, residing at Albany, in the county of Albany and State of New York, have invented certain new and useful Improvements in Processes for the Production of Coloring-Matters having the property of dyeing unmordanted cotton in an alkaline or soap bath, and being fast to washing; and I do hereby declare that the following is a full, clear, and exact description of the invention, that will enable others skilled in the art to which it appertains to make and use the same.

In Patent No. 404,331, dated May 28, 1889, I have patented a process in which I claim the use of orcine, in conjunction with other bodies, to produce coloring-matters. I have since found that the orcine may be replaced by its alkalized derivatives, and it is the use of these alkyl derivatives in the place of orcine that I now claim.

This process consists in combining one molecule of a tetrazo compound of diphenyl, ditolyl, dixylyl, stilbene, fluorine, or naphthaline, or their sulpho-acids with one molecule of one of the present known sulpho-acids of naphthylamine, and then combining this intermediate product with one molecule of an alkalized orcine, or with one molecule of a sulpho-acid of an alkalized orcine. By alkalized orcines I mean mono, di, or tri methyl, ethyl, amyl, or acetyl orcines.

The following are some examples of the different combinations that can be made, the first showing how I practically carry out my invention.

Example 1: Twenty-eight (28) pounds of benzidine sulphate (or its equivalent of the base) are converted into the tetrazo compound in the usual and well-known manner, and then run into twenty-five (25) pounds of naphthionate of soda and thirty (30) pounds of acetate of soda dissolved in about one thousand (1,000) pounds of water. This intermediate product is well stirred until all the tetrazo compound is combined. It is then run into fifty (50) pounds of caustic soda dissolved in fifty (50) gallons of water and a solution of 14.2 pounds of methyl-orcine. The temperature is then raised to about 90° centigrade and enough salt added to precipitate the color, which is then filtered off, washed, and dried. The color produced by this method is a brilliant red. In no case must the solution of methyl-orcine be added to the intermediate, or a dull color is obtained; but, on the contrary, the intermediate must always be added to the methyl-orcine and soda, so that there is never an excess of the intermediate product present.

Example 2: If toluidine be substituted for the benzidine in example 1, a color bluer than that produced by example 1 is obtained.

Example 3: Benzidine+beta-naphthylamine monosulpho-acid+amyl-orcine.

Example 4: Benzidine sulpho-acid+naphthionic acid+triethyl-orcine.

Example 5: Toluidine+beta-naphthylamine disulpho-acid+diacetyl-orcine.

Example 6: Stilbene diamine sulphoric acid +naphthionic acid+methyl-orcine.

What I claim is—

The new and improved process for the production of coloring-matters, which process consists in combining one molecule of any alkalized orcine or one molecule of a sulpho-acid of an alkalized orcine with the intermediate product formed by combining one molecule of tetrazo-diphenyl, or one molecule of any of the other herein-described tetrazo compounds, with one molecule of one of the present known sulpho-acids of naphthylamine, substantially as set forth.

RUPERT GREVILLE-WILLIAMS.

Witnesses:
F. V. M. HUDSON,
HOWARD S. NEIMAN.